US012112885B2

(12) United States Patent
Tanaka et al.

(10) Patent No.: US 12,112,885 B2
(45) Date of Patent: Oct. 8, 2024

(54) SOLENOID COIL

(71) Applicant: Hitachi Astemo, Ltd., Hitachinaka (JP)

(72) Inventors: Yuichiro Tanaka, Tokyo (JP); Shinji Seto, Tokyo (JP); Norio Nakazato, Tokyo (JP); Shunsuke Mori, Hitachinaka (JP); Yohei Katayama, Hitachinaka (JP); Teruaki Yamanaka, Hitachinaka (JP); Motohiro Hirao, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 284 days.

(21) Appl. No.: 17/597,076

(22) PCT Filed: Apr. 20, 2020

(86) PCT No.: PCT/JP2020/017117
§ 371 (c)(1),
(2) Date: Dec. 23, 2021

(87) PCT Pub. No.: WO2020/261732
PCT Pub. Date: Dec. 30, 2020

(65) Prior Publication Data

US 2022/0319751 A1 Oct. 6, 2022

(30) Foreign Application Priority Data

Jun. 26, 2019 (JP) ................................ 2019-118320

(51) Int. Cl.
*H01F 27/32* (2006.01)
*H01F 5/02* (2006.01)
(Continued)

(52) U.S. Cl.
CPC ................. *H01F 5/06* (2013.01); *H01F 5/02* (2013.01); *H01F 27/325* (2013.01); *H01F 7/16* (2013.01)

(58) Field of Classification Search
CPC .................................................... H01F 27/325
(Continued)

(56) References Cited

U.S. PATENT DOCUMENTS 4,849,728 A * 7/1989 Goll .................... G01D 5/2013
310/155
5,111,175 A * 5/1992 Sugiura .................... H01F 5/04
264/272.13
(Continued)

FOREIGN PATENT DOCUMENTS

CN 1670416 A 9/2005
EP 1 577 542 A1 9/2005
(Continued)

OTHER PUBLICATIONS

Japanese-language Office Action issued in Japanese Application No. 2019-118320 dated Jul. 5, 2022 with English translation (eight (8) pages).

(Continued)

*Primary Examiner* — Alexander Talpalatski
(74) *Attorney, Agent, or Firm* — Crowell & Moring LLP

(57) ABSTRACT

The solenoid coil includes a coil having a first end surface and a second end surface on its both ends in an axial direction, a member which is in contact with the first end surface, and has a groove through which the wire material of the coil passes, and an insulating resin formed to coat at least an outer circumferential surface and the second end surface of the coil. The resin with a substantially U-shaped section is continuously coated on at least a part of an inner circumferential surface of the coil via an area from the outer circumferential surface to the second end surface.

4 Claims, 6 Drawing Sheets

(51) Int. Cl.
*H01F 5/06* (2006.01)
*H01F 7/16* (2006.01)

(58) Field of Classification Search
USPC .................................. 336/198, 208; 335/282
See application file for complete search history.

(56) References Cited

U.S. PATENT DOCUMENTS

| | | | | | |
|---|---|---|---|---|---|
| 5,685,065 | A * | 11/1997 | Suzuki | H01F 38/12 | 123/634 |
| 5,767,758 | A * | 6/1998 | Sakamaki | H01F 38/12 | 336/107 |
| 6,118,361 | A * | 9/2000 | Ogawa | H01F 27/327 | 336/198 |
| 6,124,775 | A * | 9/2000 | Linkner, Jr. | B60T 8/363 | 335/278 |
| 6,590,487 | B2 * | 7/2003 | Uchiyama | H01F 41/127 | 336/198 |
| 7,834,734 | B2 * | 11/2010 | Nemoto | F16F 13/264 | 336/198 |
| 8,922,311 | B2 * | 12/2014 | Pal | H01F 27/2895 | 336/208 |

FOREIGN PATENT DOCUMENTS

| | | | |
|---|---|---|---|
| JP | 50-2275 | B1 | 1/1975 |
| JP | 59-17214 | A | 1/1984 |
| JP | 2002-515180 | A | 5/2002 |
| JP | 2005-277292 | A | 10/2005 |
| JP | 2018-49857 | A | 3/2018 |
| JP | 2018-186185 | A | 11/2018 |
| WO | WO 97/33287 | A1 | 9/1997 |

OTHER PUBLICATIONS

Korean-language Office Action issued in Korean Application No. 10-2021-7041669 dated Nov. 9, 2023, with Engiish translation (9 pages).

Chinese-language Office Action issued in Chinese Application No. 202080043592.9 dated Feb. 1, 2024 with English translation (12 pages).

International Search Report (PCT/ISA/210) issued in PCT Application No. PCT/JP2020/017117 dated Jun. 16, 2020 with English translation (four (4) pages).

Japanese-language Written Opinion (PCT/ISA/237) issued in PCT Application No. PCT/JP2020/017117 dated Jun. 16, 2020 (four (4) pages).

* cited by examiner

SOLENOID COIL

TECHNICAL FIELD

The present invention relates to a solenoid coil.

BACKGROUND ART

Conventionally, the solenoid coil used for the electromagnetic solenoid is formed by winding the conducting coil around the bobbin made of an insulating material such as a resin for a predetermined number of turns into multiple layers. For the purpose of reducing size and weight of the solenoid coil, the use of coil winding process of regular winding type is generally demanded as well as the thin bobbin.

Patent literature 1 has been known as the background art of the present invention. The document discloses the solenoid coil structured to have the notched portion 14 in the flange portion 12 of the bobbin 10 at one side, by which the coil 20 is drawn out, the thick part 12*a* in the range from the winding section 11 to the predetermined position in the radial direction, and the thin part 12*b* in the range from the predetermined position to the outer circumference so as to make the solenoid coil compact without deforming the bobbin during coil winding nor generating winding disorder (see Abstract).

CITATION LIST

Patent Literature

Patent Literature 1: JP 2018-186185 A

SUMMARY OF INVENTION

Technical Problem

In the Patent Literature 1, when increasing the number of turns of the winding coil while making the winding section of the bobbin thinner for attaining further reduction in size and weight of the solenoid coil, the risk of deforming the bobbin may occur, resulting in the problem of failing to further reduce the size and weight of the solenoid coil.

Solution to Problem

A solenoid coil according to the present invention includes a coil having a first end surface and a second end surface on its both ends in an axial direction, a member which is in contact with the first end surface, and has a groove through which the wire material of the coil passes, and an insulating resin formed to coat at least an outer circumferential surface and the second end surface of the coil. The resin with a substantially U-shaped section is continuously coated on at least a part of an inner circumferential surface of the coil via an area from the outer circumferential surface to the second end surface.

Advantageous Effects of Invention

The present invention ensures attainment of reduction in size and weight of the solenoid coil.

DESCRIPTION OF EMBODIMENTS

Electromagnetic Solenoid Structure

Figure 1:
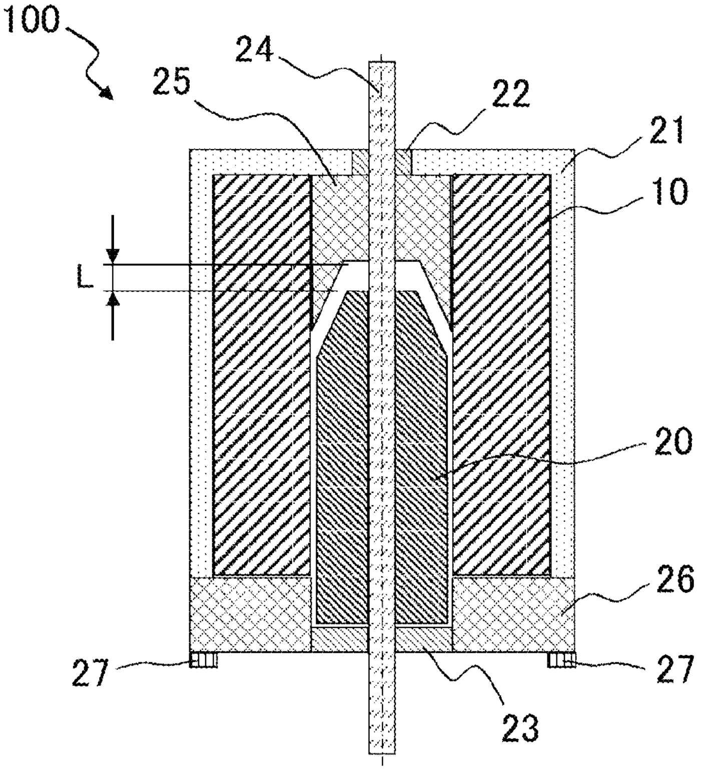
FIG. 1 is a schematic sectional view of a solenoid structure.
Figure 2:
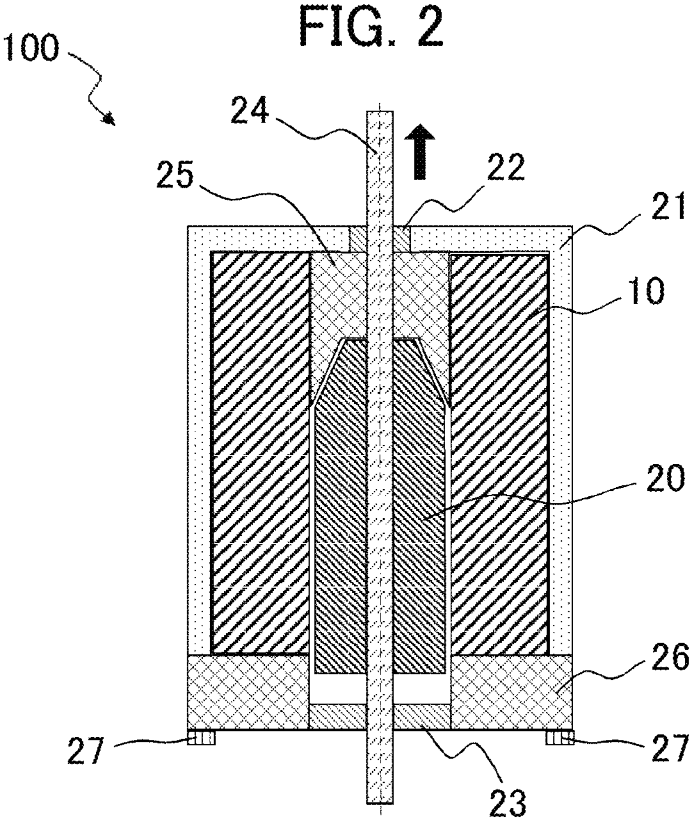
FIG. 2 is a schematic sectional view of a movable range of the solenoid.

An explanation will be made with respect to a structure of an electromagnetic solenoid including the solenoid coil according to an embodiment of the present invention referring to FIGS. 1 and 2. FIGS. 1 and 2 are sectional views each schematically illustrating a structure of an electromagnetic solenoid 100 including a solenoid coil 10 according to an embodiment of the present invention. As FIGS. 1 and 2 illustrate, the electromagnetic solenoid 100 is constituted by the solenoid coil 10, a movable core 20, an outer frame 21, bushes (bearings) 22, 23, a shaft 24, stator cores 25, 26, and bolts 27.

The solenoid coil 10 includes a conductor-wound coil through which an electric current supplied from a not shown drive circuit flows so that a magnetic field is generated. The structure of the solenoid coil 10 will be explained in detail later referring to FIGS. 9 and 10.

The movable core 20, the outer frame 21, the stator cores 25, 26 are produced using the magnetic substance such as iron, and disposed to surround the solenoid coil 10 in a sectional view so that a magnetic path is formed, through which the magnetic field generated by the solenoid coil 10 passes. The shaft 24 is engaged with the movable core 20, and supported movably in the axial direction via the bushes 22, 23 each functioning as the bearing. The outer frame 21 that encloses the solenoid coil 10 and the stator core 25 is joined to the stator core 26 using the bolts 27. The stator cores 25 and 26 are fixed to the solenoid coil 10 at given positions, respectively to form the electromagnetic solenoid 100 as illustrated in FIGS. 1 and 2.

When the electric current is not applied to the solenoid coil 10, the movable core 20 is located closer to the bush 23 as illustrated in FIG. 1. When the magnetic field is generated by the flow of the electric current to the solenoid coil 10 in the above-described state, the movable core 20 and the shaft 24 move in an arrowed direction as illustrated in FIG. 2. Upon movement by a distance L, the movable core 20 abuts on the stator core 25 into the state as illustrated in FIG. 2 so that the movable core 20 and the shaft 24 stop moving.

Conventional Solenoid Coil Structure

Figure 3:
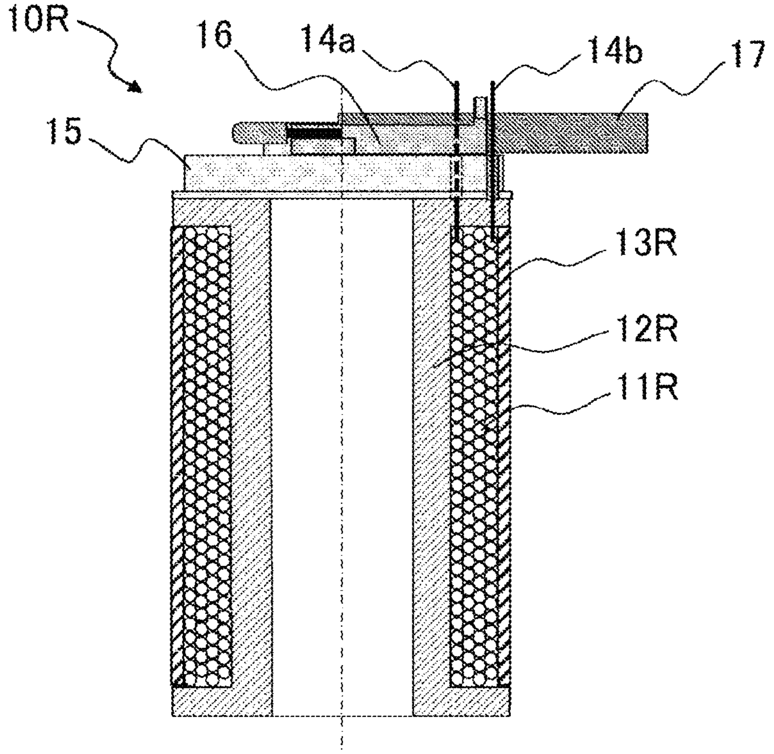
PRIOR ART FIG. 3
FIG. 3 is a schematic sectional view of a generally employed solenoid coil structure.
Figure 4:
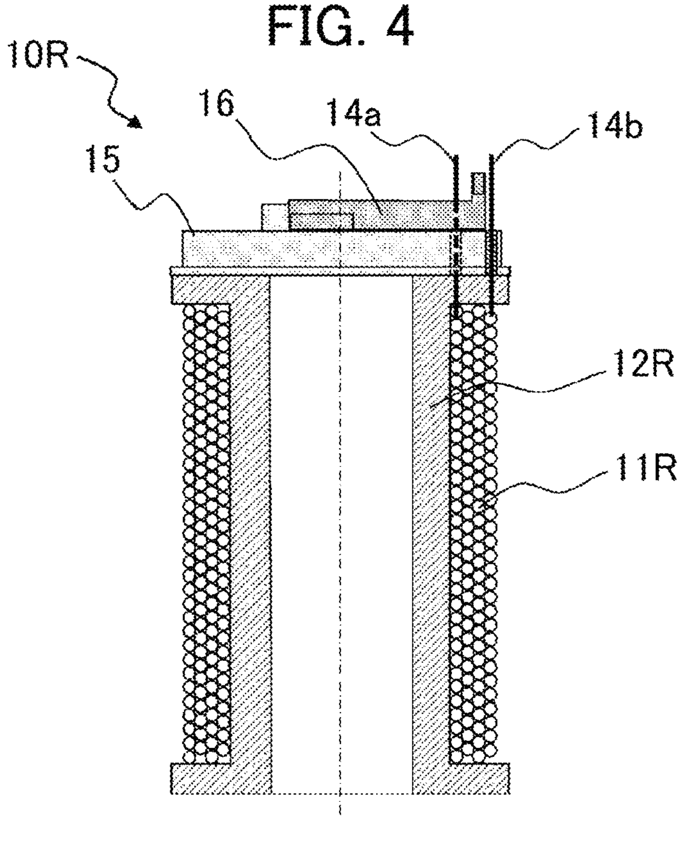
FIG. 4 PRIOR ART
FIG. 4 is a schematic sectional view of the generally employed solenoid coil structure.

Prior to the explanation of the solenoid coil 10 according to the embodiment of the present invention, a conventional solenoid coil structure will be described referring to FIGS. 3 and 4. FIGS. 3 and 4 are schematic sectional views each illustrating a structure of a solenoid coil 10R as a first comparative example. The solenoid coil 10R as illustrated in FIGS. 3 and 4 as an example of the conventionally configured solenoid coil is obtained by the process of winding the conductor such as the copper wire around a cylindrical bobbin 12R made of an insulator such as the resin under a given tensile force to form a coil 11R, and coating an outer circumferential surface of the coil 11R with a resin 13R to form the solenoid coil 10R. The bobbin 12R is required to have a certain thickness sufficient to prevent its deformation in the coil winding operation. FIG. 4 represents the state of the solenoid coil prior to coating of the outer circumferential surface of the coil 11R with the resin 13R.

A connection board 15 is disposed above the bobbin 12R. The bobbin 12R may be formed integrally with the connection board 15, or separately therefrom. The connection board 15 is a member having grooves each allowing passage of a winding start leading wire 14*a* and a winding end leading wire 14*b*, which are formed at both ends of the coil 11R. A terminal 16 for connecting the coil 11R to a wire harness 17 is disposed on the connection board 15. As FIG. 3 illustrates, the winding start leading wire 14*a* and the winding end leading wire 14*b* are respectively entwined with the terminal 16 in the state connected to the wire harness 17. As a result, the coil 11R is connected to the wire harness 17 via the terminal 16. The electric current supplied via the wire harness 17 can be applied to the coil 11R. FIG. 4 represents the state where the wire harness 17 is not connected to the terminal 16. Although not shown, the connection board 15 is insulated by coating the resin on the entire surface of the upper end including the part where the terminal 16 is connected to the wire harness 17.

Problem of Conventional Solenoid Coil Structure

Figure 5:
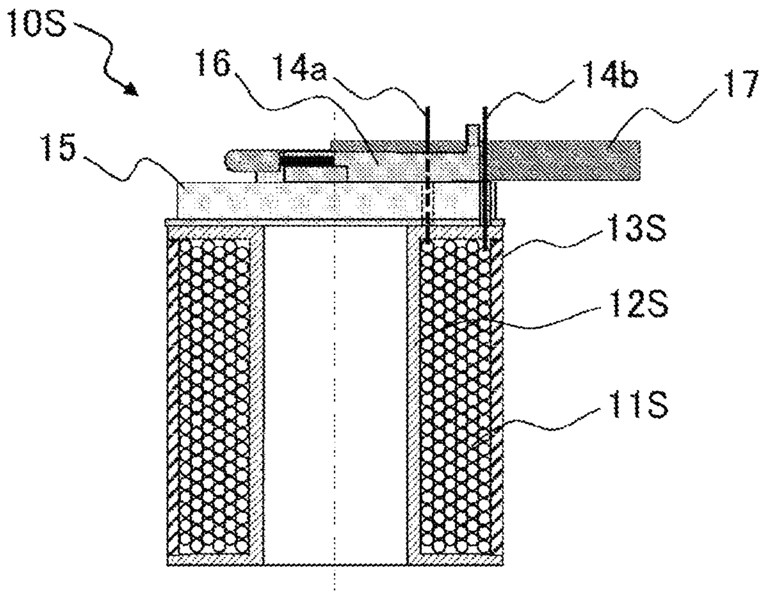
FIG. 5 PRIOR ART
FIG. 5 is a schematic sectional view of a generally employed solenoid coil structure.
Figure 6:
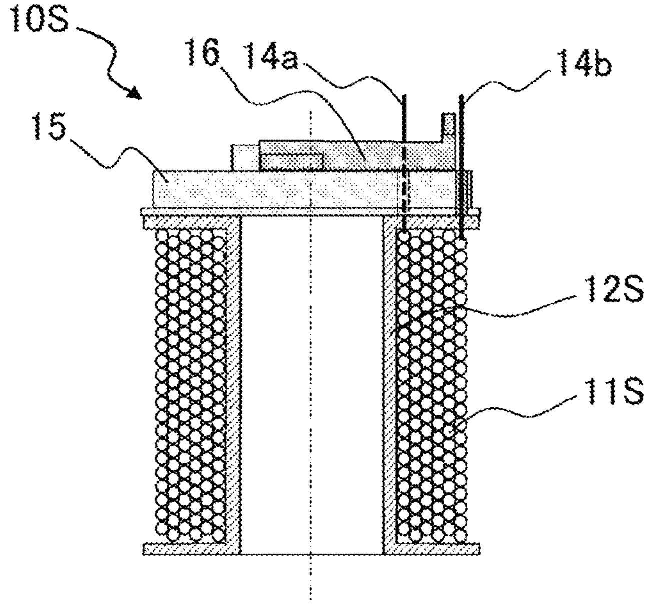
FIG. 6 PRIOR ART
FIG. 6 is a schematic sectional view of the generally employed solenoid coil structure.

The problem of the above-described conventional solenoid coil structure will be described referring to FIGS. 5, 6, 7, 8. Referring to the solenoid coil 10R as illustrated in FIGS. 3 and 4, in order to attain the size reduction, the axial length has to be decreased by thinning the bobbin 12R, and increasing the number of layers of the coil 11R. FIGS. 5, 6 are schematic sectional views each illustrating a structure of a solenoid coil 10S as a second comparative example. A coil 11S with increased number of layers more than that of the coil 11R is formed without increasing the outer diameter by employing a thin bobbin 12S instead of the bobbin 12R as illustrated in FIGS. 3, 4. An outer circumferential surface of the coil 11S is further coated with a resin 13S to form the solenoid coil 10S as illustrated in FIGS. 5, 6. The resultant solenoid coil 10S has the axial length shorter than that of the solenoid coil 10R as described in the first comparative example. Similar to FIG. 4, FIG. 6 represents the state of the solenoid coil prior to coating of the outer circumferential surface of the coil 11S with the resin 13S, and a state where the wire harness 17 is not connected to the terminal 16.

The total number of turns of the coil 11R from the winding start to the winding end according to the first comparative example is substantially the same as that of the coil 11S according to the second comparative example. In the second comparative example, the thin bobbin 12S is employed for the solenoid coil 10S to allow the conductor to be wound more inwardly than the first comparative example. As a result, the coil 11S can be flattened in the axial direction to shorten the axial length.

Figure 7:
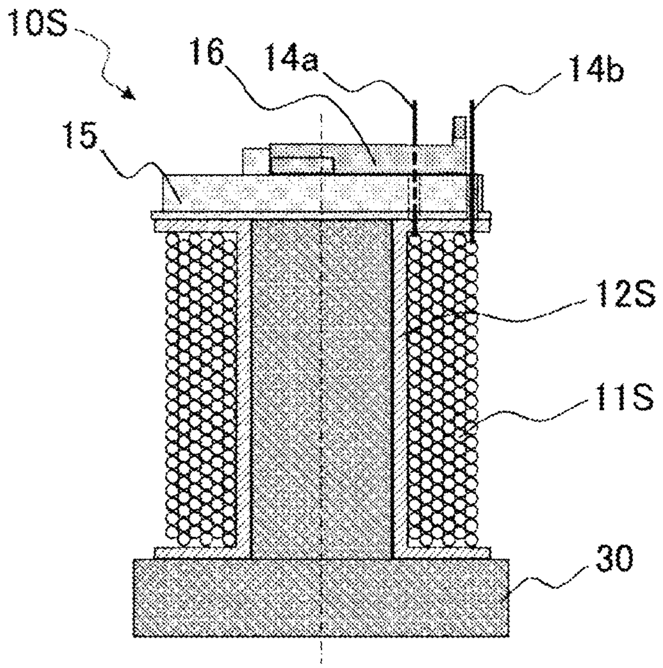
PRIOR ART FIG. 7
FIG. 7 is a schematic sectional view of the generally employed solenoid coil structure.
Figure 8:
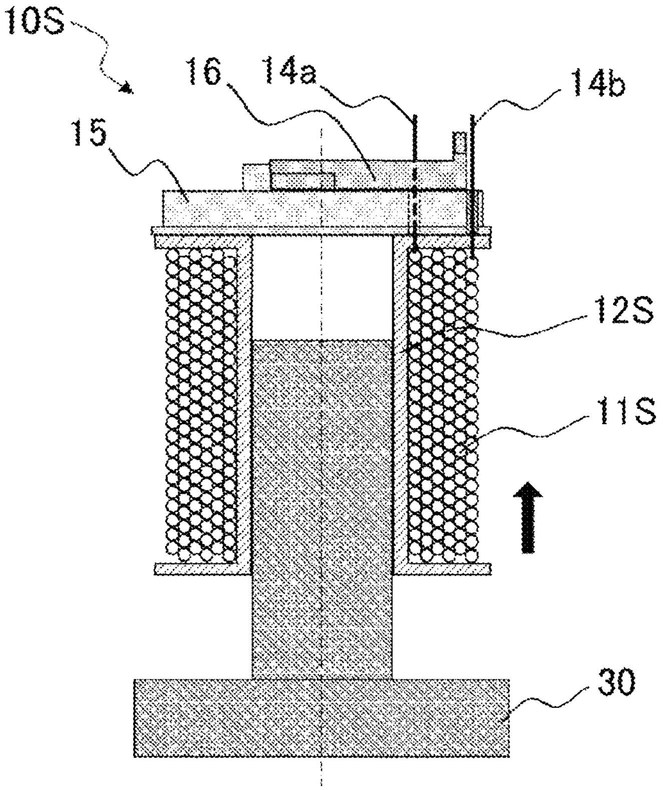
FIG. 8 PRIOR ART
FIG. 8 is a schematic sectional view of the generally employed solenoid coil structure.

An explanation will be made with respect to the problem that occurs in the coil winding operation for making the coil 11S by winding the lead wire around the bobbin 12S. In the actual coil winding operation, it is possible to make the coil 11S by attaching the bobbin 12S to a winding frame 37 of the winding machine as illustrated in FIG. 7 so that the lead wire is wound around the bobbin 12S. When pulling out the bobbin 12S from the winding frame 30 after completion of the coil winding, there may be the risk of deforming the bobbin 12S owing to the tensile force applied by the coil 11S in the winding end state as illustrated in FIG. 8.

An explanation will be made with respect to an example of the solenoid coil according to embodiments of the present invention, which attains the size reduction by solving the problem of the conventional solenoid coil structure as described above.

First Embodiment

Figure 9:
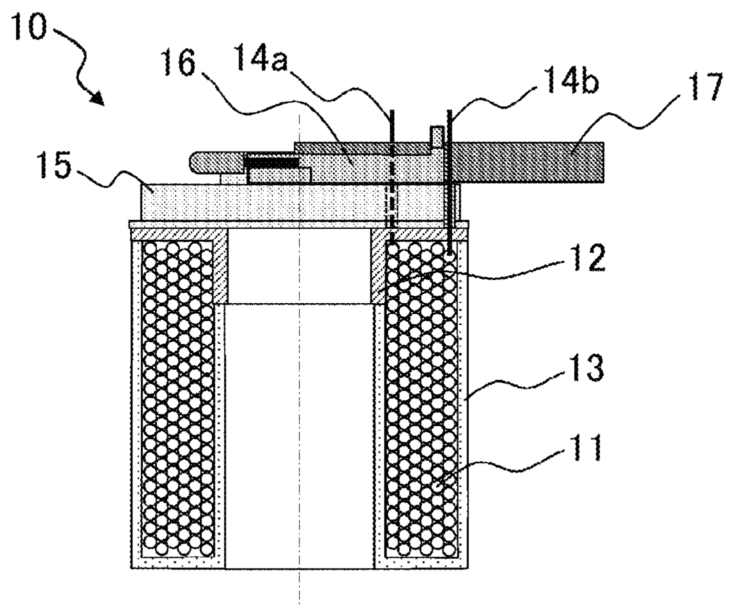
FIG. 9 is a schematic sectional view of a solenoid coil structure according to a first embodiment of the present invention.
Figure 10:
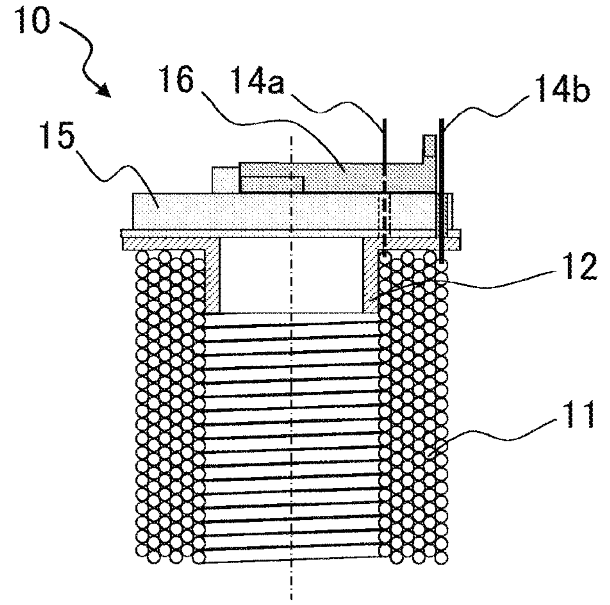
FIG. 10 is a schematic sectional view of the solenoid coil structure according to the first embodiment of the present invention.

FIGS. 9 and 10 are schematic sectional views each showing a structure of the solenoid coil 10 according to a first embodiment of the present invention. Similar to the solenoid coil 10S of the second comparative example as described referring to FIGS. 5 and 6, the conductor such as the copper wire is wound around a thin bobbin 12 made of the insulator such as the resin under the given tensile force to form a coil 11, and an outer circumferential surface of the coil 11 is coated with a resin 13 to form the solenoid coil 10 of the embodiment. The connection board 15 to which the terminal 16 is attached is disposed above the bobbin 12. The winding start leading wire 14*a* and the winding end leading wire 14*b*, which are respectively formed in both ends of the coil 11 are connected to the terminal 16 through entwining so that the coil 11 is connected to the wire harness 17 via the terminal 16. Similar to FIG. 6, FIG. 10 represents the state of the solenoid coil prior to coating of the outer circumferential surface of the coil 11 with the resin 13, and the state where the wire harness 17 is not connected to the terminal 16.

The number of layers of the coil 11S of the solenoid coil 10S of the second comparative example as illustrated in FIGS. 5 and 6 is substantially the same as that of the coil 11 of the solenoid coil 10 of the embodiment as illustrated in FIGS. 9 and 10. There are three differences between the solenoid coils 10S and 10 as described below.

The first difference exists in the use of the self-fusing wire as the conductor for the coil 11. The second difference exists in that the length of the winding section of the bobbin 12 around which the conductor is wound is shortened, and the flange at one side is eliminated. On the assumption that one of two axial end surfaces of the coil 11, which is in contact with the connection board 15 is a first end surface, and the other opposite end surface is a second end surface, the third difference exists in continuous cylindrical coating of the second end surface and the inner circumferential surface of the coil 11 with the resin 13 from the outer circumferential surface. Those differences will be described sequentially.

Concerning the first difference, the self-fusing wire denotes the enamel-coated copper wire having its upper layer further applied with a fusing layer. For example, the self-fusing wire is wound to form the coil 11 to which electric current is applied for heating. As a result, the fusing layer of the self-fusing wire is melted so that wire materials of the coil 11 can be bonded together. Since the coil 11 is formed as a result of self-fusing of the wound wire materials, the bonded coil 11 can be self-stood alone. Even in the case of using the thin bobbin 12, it is possible to prevent deformation of the bobbin as described in the second comparative example.

Concerning the second difference, in this embodiment, the winding section of the bobbin 12 is shortened to eliminate the flange at one side. Compared with the second comparative example, further reduction in the axial length of the solenoid coil 10 is attained. However, this results in exposure of the wound wire material not only on the outer circumferential surface of the coil 11 but also the second end surface and the inner circumferential surface (FIG. 9). For this reason, in the embodiment, the resin 13 is applied to a part of the inner circumferential surface of the coil 11, that is, the inner circumferential surface of the coil 11 at a part where the wire material is not wound around the outer circumference of the bobbin 12 for continuous coating via an area from the outer circumferential surface to the second end surface of the coil 11. As FIG. 9 illustrates, the resin 13 has a substantially U-shaped section along the outer circumferential surface, the second end surface, and the inner circumferential surface of the coil 11.

The resin 13 for continuously coating the outer circumferential surface, the second end surface, and the inner circumferential surface of the coil 11 may be made of the liquid resin (liquid varnish), the powder resin (powder varnish), the ultraviolet curing type resin, or the like. The above-described resin material is applied to the outer circumferential surface, the second end surface, and the inner circumferential surface of the coil 11, and allowed to cure thereon so that the resin 13 can be formed on the solenoid coil 10 of the embodiment.

The first embodiment of the present invention provides the effects to be described below.

(1) The solenoid coil 10 has the wound wire material formed through self-fusing, and includes the coil 11 having the first end surface and the second end surface on its both ends in the axial direction, the connection board 15 as the member which is in contact with the first end surface, and has a groove through which the wire material of the coil 11 passes, and the insulating resin 13 formed to coat at least the outer circumferential surface and the second end surface of the coil 11. The resin 13 with the substantially U-shaped section is continuously coated on at least a part of the inner circumferential surface of the coil 11 via the area from the outer circumferential surface to the second end surface. This makes it possible to reduce size and weight of the solenoid coil 10.

(2) The solenoid coil 10 further includes the cylindrical bobbin 12 disposed at the inner side of the coil 11. The bobbin 12 is provided with the connection board 15 as the flange at a side of the first end surface. At least a part of the wire material is wound around the outer circumference of the bobbin 12. This makes it possible to further reduce the size of the solenoid coil 10 by decreasing its axial length.

(3) The resin 13 is coated on the inner circumferential surface of the coil 11 at the part where the wire material is not wound around the outer circumference of the bobbin 12. This makes it possible to improve resistance to environment by protecting the inner circumferential surface of the coil 11 having the wire material exposed owing to decrease in the axial length.

(4) The connection board 15 includes the groove through which the winding start leading wire 14*a* of the wire material passes, and the groove through which the winding end leading wire 14*b* of the wire material passes. This makes it possible to securely fix both ends of the coil 11, and to securely connect the coil 11 to the wire harness 17 to ensure application of electric current to the coil 11.

(5) Preferably, the resin 13 is formed using the powder resin, the liquid resin, or the ultraviolet curing type resin. This makes it possible to easily form the resin 13 that protectively coats the coil 11.

Second Embodiment

Figure 11:
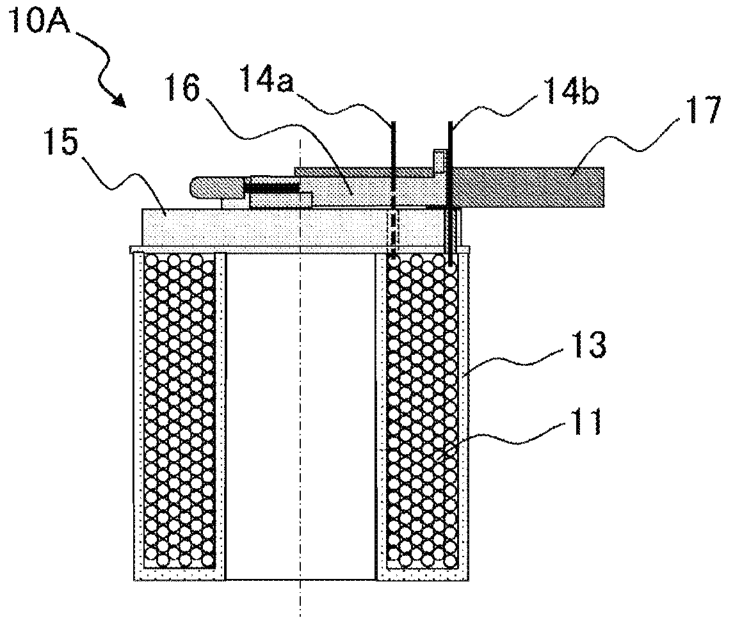
FIG. 11 is a schematic sectional view of a solenoid coil structure according to a second embodiment of the present invention.
Figure 12:
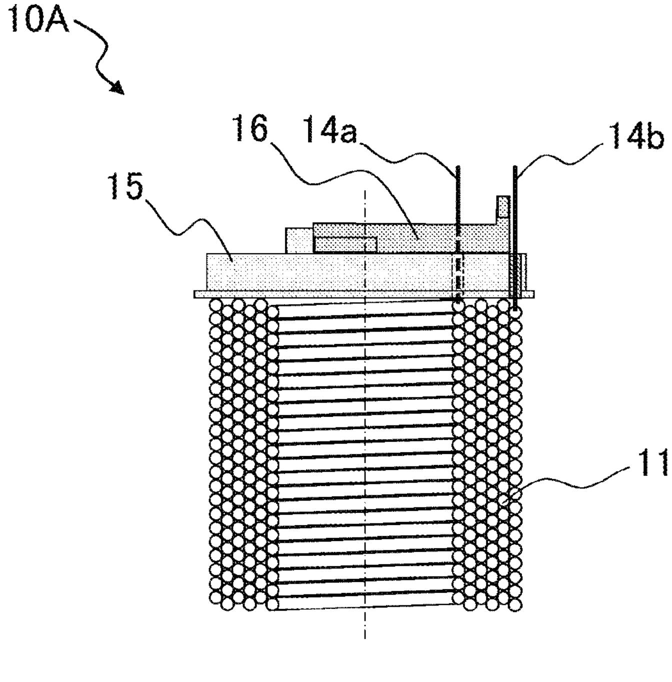
FIG. 12 is a schematic sectional view of the solenoid coil structure according to the second embodiment of the present invention.

FIGS. 11 and 12 are schematic sectional views each illustrating a structure of a solenoid coil 10A according to a second embodiment of the present invention. Similar to the first embodiment as described referring to FIGS. 9 and 10, in the case of the solenoid coil 10A of the embodiment, the conductor as the self-fusing wire is wound under the given tensile force, to which electric current is applied for heating. The fusing layer of the self-fusing wire is then melted to bond the wire materials of the coil 11. This allows the bonded coil 11 to be self-stood alone. The number of the turns of the coil as illustrated in FIG. 9 is substantially the same as that of turns of the coil as illustrated in FIG. 11. The resin 13 is applied to the outer circumferential surface, the second end surface, and the inner circumferential surface of the coil 11 so as to be continuously coated for insulating purpose.

The respective functions of the terminal 16, the connection board 15, the winding start leading wire 14*a*, the winding end leading wire 14*b*, and the wire harness 17 are the same as those illustrated in FIGS. 9, 10. Similar to FIG. 10, FIG. 12 represents the state of the solenoid coil prior to coating of the outer circumferential surface of the coil 11 with the resin 13, and the state where the wire harness 17 is not connected to the terminal 16.

The difference between the solenoid coil 10A of this embodiment and the solenoid coil 10 as described in the first embodiment exists in the absence/presence of the bobbin 12. In the case of the solenoid coil 10 of the first embodiment, the coil 11 is formed by using the bobbin 12 having the winding section shortened, and the flange at one side eliminated. In the case of the solenoid coil 10A of the embodiment, the conductor is directly wound around the winding frame, to which the electric current is applied for heating. The fusing layer of the self-fusing wire is then melted to bond the wire materials of the coil 11, resulting in the bobbin-less coil 11 to be self-stood in the absence of the bobbin 12.

The second embodiment of the present invention as described above provides the effects to be described below.

The inner circumferential surface of the coil 11 is coated with the resin 13. In the case of making the bobbin-less coil 11 self-stood, it is possible to protect the inner circumferential surface of the coil 11, which is expected to have the wire materials exposed. It is therefore possible to secure the resistance to environment upon further reduction in size and weight of the bobbin-less solenoid coil 10A.

In both the first and the second embodiments, it is possible to use the wire material of square type or rectangular type for further improving the space factor of the coil. Especially when using the wire material of square type or rectangular type, the coil can be self-stood without using the self-fusing wire. Even when using the wire material with a circular section, it does not have to be the self-fusing wire. It is possible to use the tape or the like to allow the coil to be self-stood alone.

The foregoing embodiments and various modifications are mere examples. The present invention is not limited to contents of them so long as characteristics of the invention are not impaired. Various embodiments and modifications have been described. The present invention, however, is not limited to contents of them. Other possible embodiments considered to be implementable within the technical ideas of the present invention are contained in the scope of the present invention.

The disclosed content of the following application to which this application claims priority is hereby incorporated by reference.

JP2019-118320 (filed on Jun. 26, 2019).

LIST OF REFERENCE SIGNS

10, 10A, 10R, 10S solenoid coil,
11, 11R, 11S coil,
12, 12R, 12S bobbin,
13, 13R, 13S resin,
14*a* winding start leading wire,
14*b* winding end leading wire,
15 connection board,
16 terminal,
17 wire harness,
20 movable core,
21 resin,
22, 23 bush (bearing),
24 shaft,
25, 26 stator core,
27 bolt,
30 winding frame,
100 solenoid

The invention claimed is:

1. A solenoid coil, comprising:

a coil having a first end surface and a second end surface on its both ends in an axial direction;

a member which is in contact with the first end surface, and has a groove through which the wire material of the coil passes;

an insulating resin formed to coat at least an outer circumferential surface and the second end surface of the coil, wherein the resin with a substantially U-shaped section is continuously coated on at least a part of an inner circumferential surface of the coil via an area from the outer circumferential surface to the second end surface; and a cylindrical bobbin disposed at an inner side of the coil, wherein the bobbin is provided with the member in the form of a flange at a side of the first end surface, and at least a part of the wire material is wound around an outer circumference of the bobbin, and the resin is coated on the inner circumferential surface of the coil at a part where the wire material is not wound around the outer circumference of the bobbin.

2. The solenoid coil according to claim 1, wherein the resin is coated on the inner circumferential surface of the coil is coated.

3. The solenoid coil according to claim 1, wherein the member includes a groove through which a winding start leading wire of the wire material passes, and a groove through which a winding end leading wire of the wire material passes.

4. The solenoid coil according to claim 1, wherein the resin is formed using a powder resin, a liquid resin, or an ultraviolet curing type resin.

* * * * *